(12) United States Patent
Chiu et al.

(10) Patent No.: US 11,418,275 B2
(45) Date of Patent: Aug. 16, 2022

(54) AUDIO PLAYBACK SYSTEM AND METHOD

(71) Applicant: Realtek Semiconductor Corporation, Hsinchu (TW)

(72) Inventors: Yi-Fan Chiu, Taoyuan (TW); You-De Liu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 140 days.

(21) Appl. No.: 16/885,793

(22) Filed: May 28, 2020

(65) Prior Publication Data
US 2020/0396015 A1    Dec. 17, 2020

(30) Foreign Application Priority Data
Jun. 17, 2019 (TW) ................................ 108120929

(51) Int. Cl.
*H04J 3/06* (2006.01)
*H04W 56/00* (2009.01)
(Continued)

(52) U.S. Cl.
CPC ............ *H04J 3/0661* (2013.01); *G06F 3/165* (2013.01); *H04W 56/001* (2013.01); *H04W 84/12* (2013.01)

(58) Field of Classification Search
CPC .......... H04J 3/06; H04J 3/0632; H04J 3/0644; H04J 3/0661; H04J 3/0697; G06F 3/165; G06F 16/639; H04L 65/60; H04L 65/601; H04L 65/4084; H04N 21/2368; H04N 21/4341; H04W 56/001; H04W 84/12
See application file for complete search history.

(56) References Cited

U.S. PATENT DOCUMENTS

| 2010/0293286 A1* | 11/2010 | Nikkila .................. H04W 84/12 709/231 |
| 2014/0181270 A1* | 6/2014 | Millington .............. G06F 3/167 709/219 |

(Continued)

FOREIGN PATENT DOCUMENTS

CN        108462991 A        8/2018

*Primary Examiner* — Marsha D Banks Harold
*Assistant Examiner* — Dharmesh J Patel
(74) *Attorney, Agent, or Firm* — Locke Lord LLP; Tim Tingkang Xia, Esq.

(57) ABSTRACT

An audio playback system that includes audio playback devices each including a communication module, a playback module and a processing module is provided. The communication module receives a beacon signal and audio signal packets and generates an interrupt signal. The processing module receives the interrupt signal to retrieve an audio source timestamp corresponding to an audio source system time from the beacon signal, compares the audio source timestamp with an internal time generated based on an internal system time when the beacon signal is received to calculate a difference therebetween, receives a playback initialization signal from the audio source device that includes an audio source system playback initialization time, calculates an internal system playback initialization time according to the difference and the audio source system playback initialization time and controls the playback module to playback the audio signal packets from the internal system playback initialization time.

8 Claims, 3 Drawing Sheets

(51) Int. Cl.
*G06F 3/16* (2006.01)
*H04W 84/12* (2009.01)

(56) References Cited

U.S. PATENT DOCUMENTS

2016/0323610 A1* 11/2016 Lin .................... H04N 21/2187
2017/0324888 A1* 11/2017 Boone ............... H04W 56/0015
2018/0006802 A1* 1/2018 Knowles ............... H04J 3/0667
2018/0165056 A1* 6/2018 Lay .................... H04W 56/005

* cited by examiner

AUDIO PLAYBACK SYSTEM AND METHOD

RELATED APPLICATIONS

This application claims priority to Taiwan Application Serial Number 108120929, filed Jun. 17, 2019, which is herein incorporated by reference.

BACKGROUND

Field of Invention

The present invention relates to a technology. More particularly, the present invention relates to an audio playback system and an audio playback method.

Description of Related Art

By using wireless technology, e.g. WiFi, each of the amplifiers in a wireless audio playback system can be connected to a wireless base station to playback audio signal packets delivered by the wireless base station. However, the internal system time of each of the amplifiers can be different and the internal system time can also be different from the system time of the wireless base station. If a coordinating mechanism does not exist, each of the amplifiers may not playback the audio signal packets simultaneously.

Accordingly, what is needed is an audio playback system and an audio playback method to address the issues mentioned above.

SUMMARY

An aspect of the present invention is to provide an audio playback system that includes a plurality of audio playback devices. Each of the audio playback devices includes a communication module, a playback module and a processing module. The communication module is configured to receive a beacon signal and a plurality of audio signal packets from an audio source device and generates an interrupt signal while receiving the beacon signal. The processing module is configured for performing the steps outlined below. The interrupt signal is received through the communication module to retrieve an audio source timestamp corresponding to an audio source system time from the beacon signal and the audio source timestamp is compared with an internal time generated based on an internal system time when the beacon signal is received to calculate a difference between the audio source system time and the internal system time. A playback initialization signal is received from the audio source device through the communication module that includes an audio source system playback initialization time set according to the audio source system time. An internal system playback initialization time is calculated according to the difference and the audio source system playback initialization time. The playback module is controlled to playback the audio signal packets from the internal system playback initialization time.

Another aspect of the present invention is to provide an audio playback method that includes the steps outlined below. A beacon signal and a plurality of audio signal packets are received from an audio source device and an interrupt signal is generated while receiving the beacon signal by a communication module included in each of a plurality of audio playback devices. The interrupt signal is received through the communication module to retrieve an audio source timestamp corresponding to an audio source system time from the beacon signal by a processing module of each of the plurality of audio playback devices. The audio source timestamp is compared with an internal time generated based on an internal system time when the beacon signal is received to calculate a difference between the audio source system time and the internal system time by the processing module. A playback initialization signal is received from the audio source device through the communication module that includes an audio source system playback initialization time set according to the audio source system time by the processing module. An internal system playback initialization time is calculated according to the difference and the audio source system playback initialization time by the processing module. The playback module is controlled to playback the audio signal packets from the internal system playback initialization time by the processing module.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
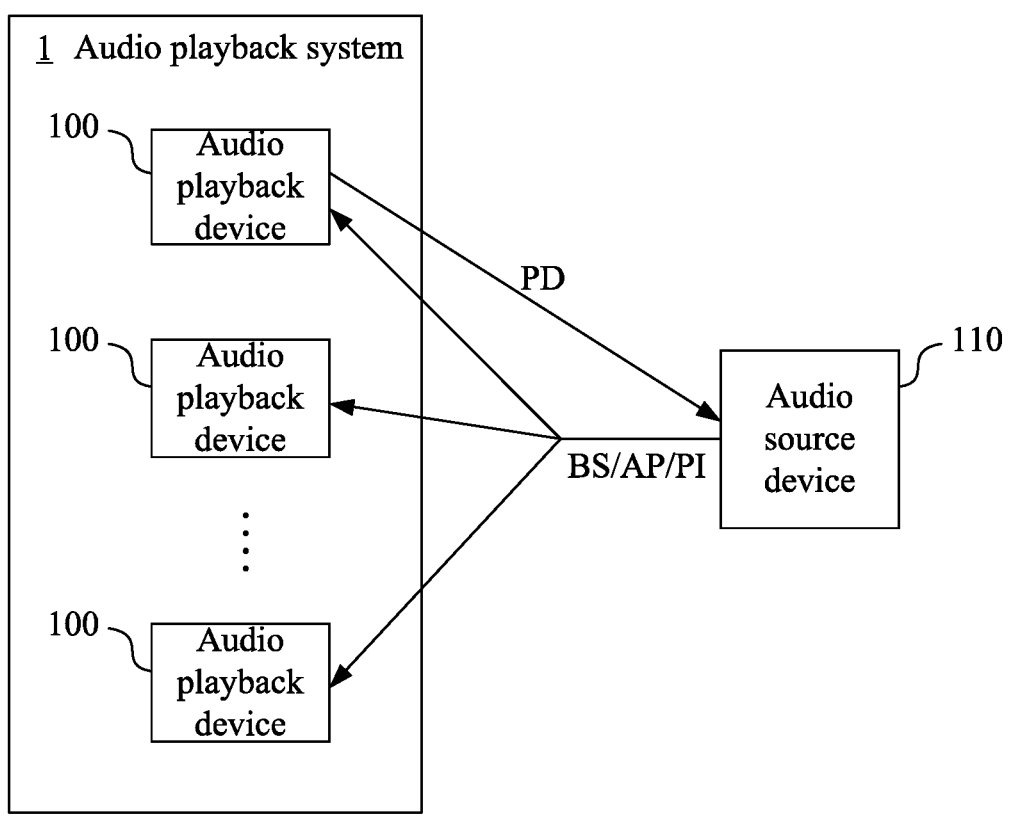
FIG. 1 is a block diagram of an audio playback system in an embodiment of the present invention.

Reference is now made to FIG. 1. FIG. 1 is a block diagram of an audio playback system 1 in an embodiment of the present invention. The audio playback system 1 includes a plurality of audio playback devices 100.

The audio playback devices 100 can be such as, but not limited to audio amplifiers responsible for playing the sounds of different channels or audio amplifiers that play the same audio signal. The audio playback devices 100 are respectively connected to an audio source device 110 by using WiFi technology.

In an embodiment, the audio source device 110 can be a multimedia playback device that is able to access network, e.g. a television that is connected to the network. After accessing multimedia data from the network, the audio source device 110 can act as an access point to provide audio signal packets AP to be playback in all the audio playback devices 100.

Figure 2:
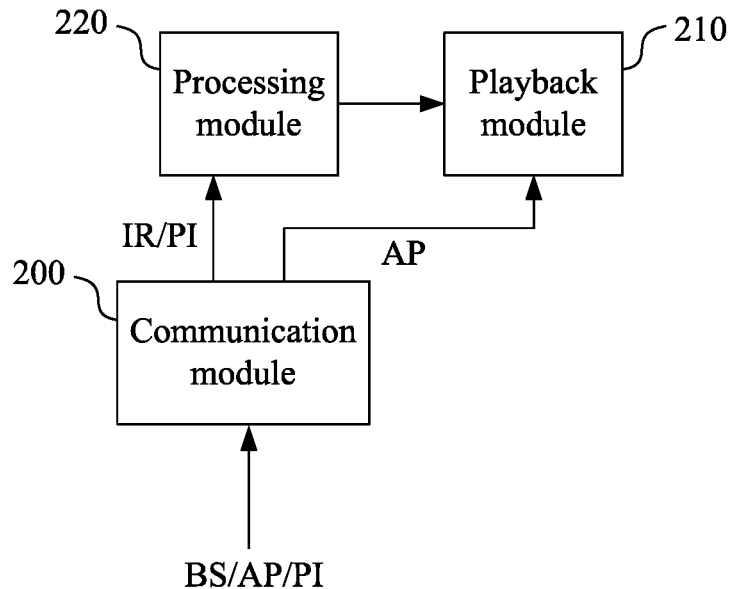
FIG. 2 is a block diagram of one of the audio playback devices in an embodiment of the present invention.

Reference is now made to FIG. 2. FIG. 2 is a block diagram of one of the audio playback devices 100 in an embodiment of the present invention. Each of the audio playback devices 100 includes a communication module 200, a playback module 210 and a processing module 220.

In an embodiment, the communication module 200 is a WiFi communication module. The communication module 200 is configured to receive a beacon signal BS and the audio signal packets AP from the audio source device 110.

In an embodiment, the beacon signal BS is a signal having a fixed frequency that the audio source device 110 keeps delivering to the environment and can be received by the communication module 200 of the audio playback devices 100. The audio signal packets AP are the packets that include the music content and can be playback by the playback module 210 at the appropriate time spot.

In an embodiment, after receiving the beacon signal BS, the communication module 200 generates an interrupt signal IR to the processing module 220. The communication module 200 is able to operate a firmware that includes such as, but not limited to interrupt service routine (ISR) to trigger the pins between the communication module 200 and the processing module 220 to generate the interrupt signal IR to the processing module 220. The pins can be such as, but not limited to general purpose input/output (GPIO) ports.

Figure 3:
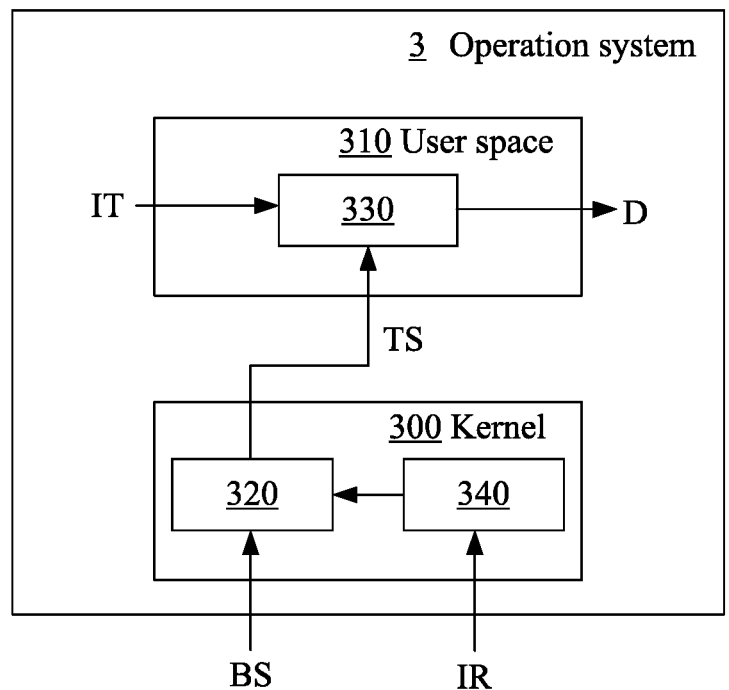
FIG. 3 is a diagram of an operation system operated by the processing module in an embodiment of the present invention.

Reference is now made to FIG. 3. FIG. 3 is a diagram of an operation system 3 operated by the processing module 220 in an embodiment of the present invention.

In an embodiment, the processing module 220 is configured to execute the operation system 3 that includes a kernel 300 and a user space 310 and execute a communication module driver program 320 and an audio application program 330 respectively.

The interrupt signal IR can trigger the communication module driver program 320 by using such as, but not limited to an interrupt handler 340 in the kernel 300 so that the communication module driver program 320 retrieves the audio source timestamp TS that corresponds to an audio source system time from the beacon signal BS according to the interrupt signal IR. The audio source system time is the system time of the audio source device 110 and the audio source timestamp TS is the timestamp of the time spot established based on such system time.

The audio playback device 100 has such as, but not limited to a time counter module (not illustrated) that allows the processing module 220 to establish an internal system time accordingly and generate a corresponding internal time IT accordingly.

The system times maintained by the audio playback devices 100 and the audio source device 110 are not necessarily the same. Further, the system times between different audio playback devices 100 may be different as well. Differences therefore exist between each two of the system times of the audio playback devices 100 and the audio source device 110. As a result, for each of the audio playback devices 100, the audio application program 330 of the processing module 220 further receives the audio source timestamp TS and compares the audio source timestamp TS with the internal time IT generated based on the internal system time when the beacon signal BS is received to calculate the difference D between the audio source system time and the internal system time. It is noticed that the processing module 220 of different audio playback devices 100 may calculate different differences D.

Subsequently, the audio application program 330 of the processing module 220 receives a playback initialization signal PI from the audio source device 110 through the communication module 200. The playback initialization signal PI includes an audio source system playback initialization time set according to the audio source system time.

In an embodiment, the audio source system playback initialization time can be determined by the processing module 220 of one of the audio playback devices 100 illustrated in FIG. 1 and can be transmitted to the audio source device 110 by using a playback triggering signal PD that includes the audio source system playback initialization time through the communication module 200. The audio source device 110 thus further generates the playback initialization signal PI to all the audio playback devices 100. In an embodiment, the audio playback device 100 that is used to determine the audio source system playback initialization time is the first one of the audio playback devices 100 that connects to the audio source device 110.

The audio application program 330 of the processing module 220 further calculates an internal system playback initialization time according to the difference D described above and the audio source system playback initialization time included in the playback initialization signal PI. For example, when the internal system time is behind the audio source system time, the processing module 220 adds the difference D to the audio source system playback initialization time to obtain the internal system playback initialization time.

After the internal system playback initialization time is calculated, the audio application program 330 of the processing module 220 further controls the playback module 210 to playback the audio signal packets AP from the internal system playback initialization time. As a result, though the internal system times of the different audio playback devices 100 are different, the audio source system time of the audio source device 110 can be used as a reference. The difference D corresponding to each of the audio playback devices 100 can be calculated to obtain the corresponding time spot of the respective internal system time to accomplish a simultaneous playback mechanism.

Each of the audio playback devices 100 of the audio playback system 1 of the present invention can use the interrupt signal IR delivered by the communication module 200 to allow the processing module 220 to quickly retrieve the audio source timestamp TS with a low amount of delay since the interrupt signal IR is not transmitted through other paths, e.g. USB. The processing module 220 further calculates the difference of the system time between the audio playback devices 100 and the audio source device 110 and calculates the internal system playback initialization time according to the difference described above and the audio source system playback initialization time included in the playback initialization signal PI. All the audio playback devices 100 can thus playback the audio signal packets AP simultaneously with great accuracy without generating time difference therebetween.

Figure 4:
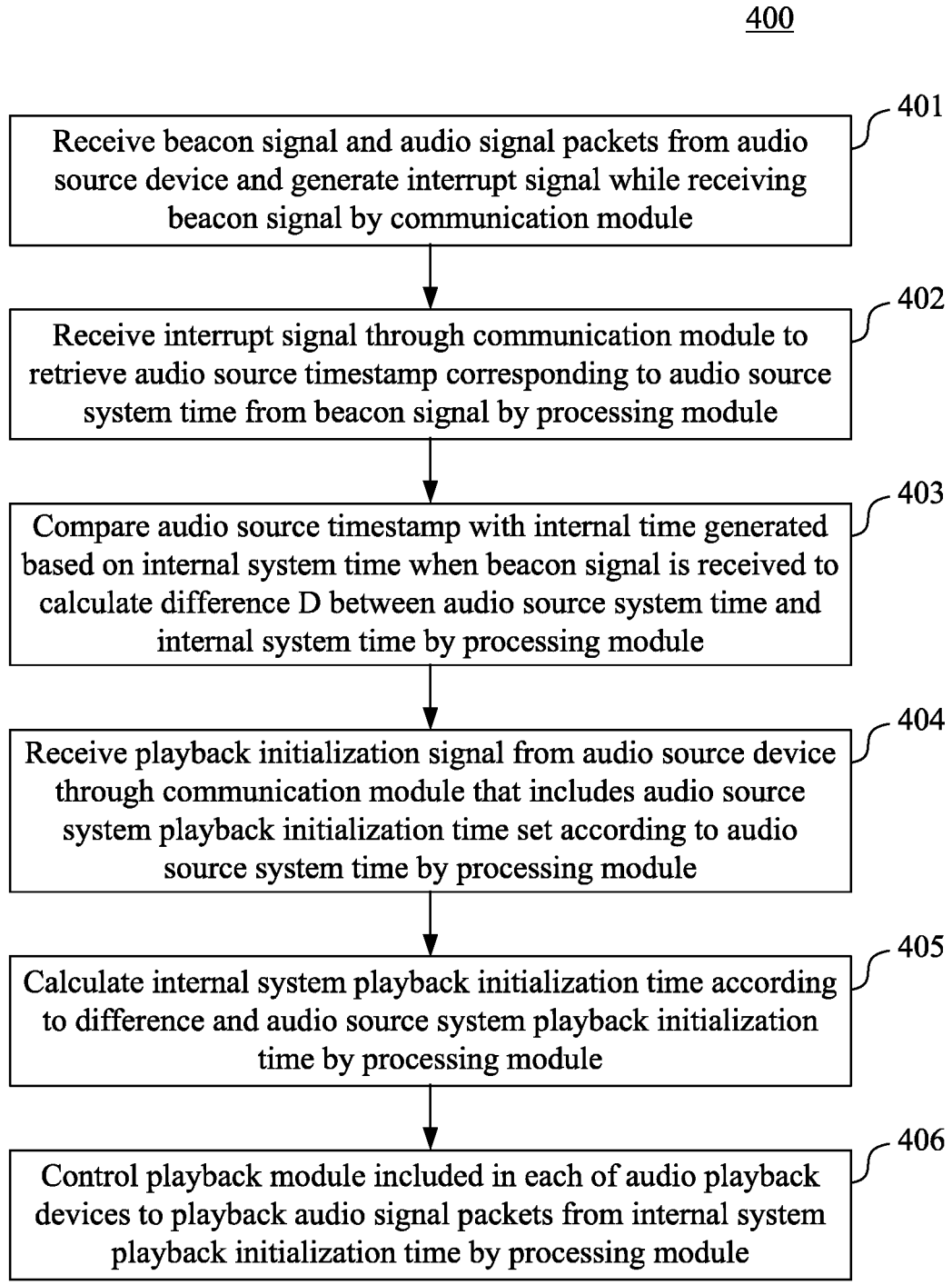
FIG. 4 is a flow chart of an audio playback method in an embodiment of the present invention.

Reference is now made to FIG. 4. FIG. 4 is a flow chart of an audio playback method 400 in an embodiment of the present invention. The audio playback method 400 can be used in the audio playback system 1 illustrated in FIG. 1. The audio playback method 400 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 401, the beacon signal BS and the plurality of audio signal packets AP are received from the audio source device 110 and the interrupt signal IR is generated while receiving the beacon signal BS by the communication module 200 included in each of the audio playback devices 100.

In step 402, the interrupt signal IR is received through the communication module 200 to retrieve the audio source timestamp TS corresponding to the audio source system time from the beacon signal BS by the processing module 220 of each of the audio playback devices 100.

In step 403, the audio source timestamp TS is compared with the internal time IT generated based on the internal system time when the beacon signal BS is received to calculate the difference D between the audio source system time and the internal system time by the processing module 220.

In step 404, the playback initialization signal PI is received from the audio source device 110 through the communication module 200 that includes the audio source system playback initialization time set according to the audio source system time by the processing module 220.

In step 405, the internal system playback initialization time is calculated according to the difference D and the audio source system playback initialization time by the processing module 220.

In step 406, the playback module 210 included in each of the audio playback devices 100 is controlled to playback the audio signal packets AP from the internal system playback initialization time by the processing module 220.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An audio playback system comprising:
   a plurality of audio playback devices each comprising:
      a communication module configured to receive a beacon signal and a plurality of audio signal packets from an audio source device and generates an interrupt signal while receiving the beacon signal;
      a playback module; and
      a processing module configured for:
         receiving the interrupt signal through the communication module to retrieve an audio source timestamp corresponding to an audio source system time from the beacon signal and comparing the audio source timestamp with an internal time generated based on an internal system time when the beacon signal is received to calculate a difference between the audio source system time and the internal system time;
         receiving a playback initialization signal from the audio source device through the communication module that comprises an audio source system playback initialization time set according to the audio source system time;
         calculating an internal system playback initialization time according to the difference and the audio source system playback initialization time; and
         controlling the playback module to playback the audio signal packets from the internal system playback initialization time,
         wherein the processing module is configured to execute a communication module driver program and an audio application program to receive the interrupt signal through the communication module to retrieve the audio source timestamp by using the communication module driver program and calculate the difference and the internal system playback initialization time by using the audio application to further control the playback module to playback the audio signal packets.

2. The audio playback system of claim 1, wherein the audio source system time is determined by the processing module of one of the audio playback devices and a playback triggering signal comprising the audio source system time is transmitted by the processing module through the communication module to the audio source device such that the audio source device generates the playback initialization signal.

3. The audio playback system of claim 2, wherein the one of the audio playback devices that determines the audio source system time is the first one of the audio playback devices that connects to the audio source device.

4. The audio playback system of claim 1, wherein the audio playback devices are respectively connected to the audio source device by using WiFi technology.

5. An audio playback method comprising:
   receiving a beacon signal and a plurality of audio signal packets from an audio source device and generating an interrupt signal while receiving the beacon signal by a communication module comprised in each of a plurality of audio playback devices;
   receiving the interrupt signal through the communication module to retrieve an audio source timestamp corresponding to an audio source system time from the beacon signal by a processing module of each of the plurality of audio playback devices;
   comparing the audio source timestamp with an internal time generated based on an internal system time when the beacon signal is received to calculate a difference between the audio source system time and the internal system time by the processing module;
   receiving a playback initialization signal from the audio source device through the communication module that comprises an audio source system playback initialization time set according to the audio source system time by the processing module;
   calculating an internal system playback initialization time according to the difference and the audio source system playback initialization time by the processing module; and
   controlling the playback module to playback the audio signal packets from the internal system playback initialization time by the processing module,
   wherein the processing module is configured to execute a communication module driver program and an audio application program to receive the interrupt signal through the communication module to retrieve the audio source timestamp by using the communication module driver program and calculate the difference and the internal system playback initialization time by using the audio application to further control the playback module to playback the audio signal packets.

6. The audio playback method of claim 5, further comprising:
   determining the audio source system time by the processing module of one of the audio playback devices and transmitting a playback triggering signal comprising the audio source system time by the processing module through the communication module to the audio source device such that the audio source device generates the playback initialization signal.

7. The audio playback method of claim 6, wherein the one of the audio playback devices that determines the audio source system time is the first one of the audio playback devices that connects to the audio source device.

8. The audio playback method of claim 5, wherein the audio playback devices are respectively connected to the audio source device by using WiFi technology.

\* \* \* \* \*